United States Patent [19]
Hershberg

[11] Patent Number: 5,912,883
[45] Date of Patent: Jun. 15, 1999

[54] SYSTEM FOR REMOTE ACCESS TO COMPUTER NETWORK

[75] Inventor: David Hershberg, Port Jefferson, N.Y.

[73] Assignee: WorldComm Systems, Inc., Hauppauge, N.Y.

[21] Appl. No.: 08/742,351

[22] Filed: Nov. 1, 1996

[51] Int. Cl.⁶ ..................................................... H04J 1/06
[52] U.S. Cl. ............................................ 370/319; 370/326
[58] Field of Search ..................................... 370/316, 319, 370/321, 323, 326, 338, 401, 402, 343, 344, 480; 375/222

[56] References Cited

U.S. PATENT DOCUMENTS 5,280,625   1/1994   Howarter et al. ........................ 395/200

*Primary Examiner*—Chi H. Pham
*Assistant Examiner*—Maikhanh Tran
*Attorney, Agent, or Firm*—Hopgood, Calimafde, Kalil & Judlowe, LLP

[57] ABSTRACT

A system for remotely accessing computer networks is provided in which a central hub is connected to a computer network. The central hub may then be connected to a plurality of remote sites through an earth-orbiting satellite. Users at multiple remote sites may be connected to the central hub simultaneously through frequency management techniques.

14 Claims, 4 Drawing Sheets

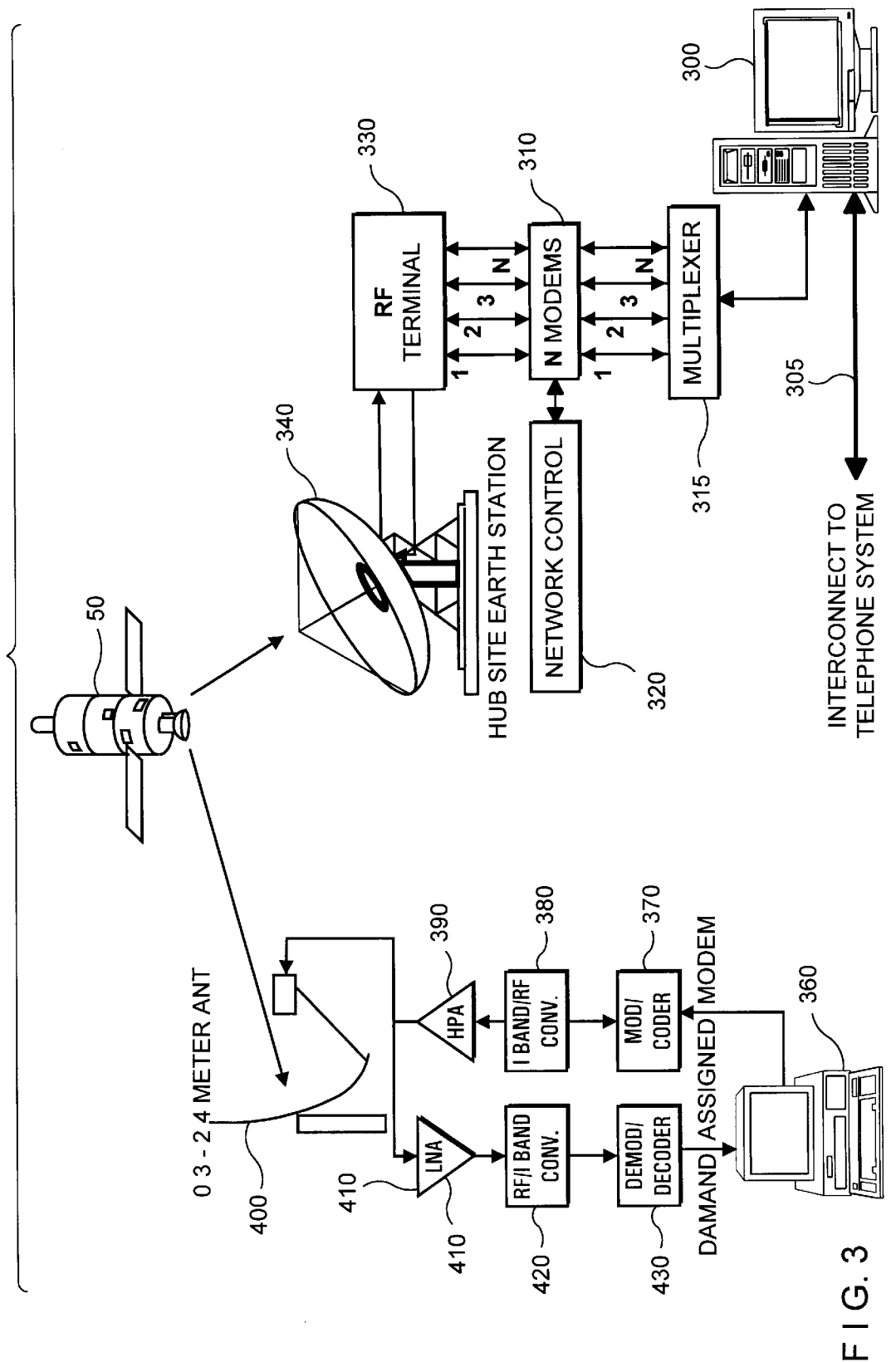
F I G. 3

SYSTEM FOR REMOTE ACCESS TO COMPUTER NETWORK

FIELD OF THE INVENTION

The invention relates generally to a system for interconnecting computer systems. More specifically, the invention relates to a system for providing computer network access to remote computer workstations.

BACKGROUND OF THE INVENTION

Computer networking is rapidly becoming a standard way of life. Computer networks have grown from isolated connections among research scientists, to the "Information Superhighway" of today. Every day, millions of consumers, businesses and other organizations have access to a rapidly-increasing resource of materials over the Internet. Some examples of these resources are on-line universities, museums, libraries, and "Newsgroups," which provide forums for discussion on a huge variety of subjects.

Perhaps the fastest-growing segment of the Internet is known as the World Wide Web. Through the use of standardized text and graphic formats, computer users can easily access and navigate through the wealth of available information. Due to its highly graphical format, businesses have also begun advertising through the Web, by allowing users to download images, video or sound clips, and/or text documents relating to their products. Some businesses have already begun to accept orders directly over the Internet, using credit card information, or an experimental new type of debit account known as "e-cash" or electronic cash.

In the developed countries, gaining access to the Internet is a simple matter of desire. With proper computer equipment, users can easily contract, for a nominal fee, with any of a growing number of "providers" that allow access to the Internet, usually over the phone system. Some providers offer a simple direct link, while others, such as COMPUSERVE and AMERICA ONLINE offer their own services and resources in addition to access to the Web. Universities and other organizations are often directly connected to the Internet and automatically provide access to any of their students, professors, members, etc. As a result, information is becoming more and more readily available. Currently, AMERICA ONLINE alone estimates that it handles hundreds of thousands pieces of e-mail every day.

As mentioned, access to the Internet is largely through phone lines or dedicated communications lines—in other words, a sophisticated telecommunications infrastructure. Such infrastructure only exists today in developed countries. In undeveloped countries, villages and communities separated by vast distances are fortunate if they have limited telephone service, if any. Even when there is phone service, the quality of the telephone connection is often poorly suited to sustain the bandwidth necessary to support digital data transfer at a usable rate.

The lack of access to the Web and Internet has not been perceived as a problem in the past. Users were mostly academics, researchers, or computer enthusiasts and the information available was often of a highly specialized nature. Now, however, with more users coming from the general population, and with the information being more broad-based, it is believed that access to the Internet will be mandatory for a country or society to participate in the global community of the very near future.

For example, physicians in developed countries can now confer electronically about cases, search massive medical databases and browse the latest medical journals, all from their personal workstation. Schoolchildren can search encyclopedias, visit faraway places on their screens, or even "chat" with other children around the country and the globe to discuss their homework.

Similarly, as corporations and other organizations extend their reach globally, the need for computer access in remote locations has also increased. This need applies to internal networks, intranets or any other organizational network.

Unfortunately, the obvious solution to the problem is not a currently economically viable one. If a proper infrastructure were installed connecting these remote communities, access would no longer be a problem. However, the astronomical cost of this installation, in the face of pressing healthcare, hunger and other priorities, simply cannot be justified today. Since the remote users will have potentially limited funds to expend on network access compared to their developed-world counterparts, it would be difficult, if not impossible, to recoup any investment spent on the infrastructure, notwithstanding the unquantifiable benefits to the users themselves.

SUMMARY OF THE INVENTION

In view of the foregoing deficiencies or lack of viable existing systems, it is an object of the invention to provide a system for remotely accessing computer networks.

It is another object of the invention to provide a system for remotely accessing computer networks that does not rely on an existing, telecommunications infrastructure.

It is a further object of the invention to provide a system for remotely accessing computer networks that is capable of interconnecting workstations over relatively long distances.

It is yet another object of the invention to provide a system for remotely accessing computer networks that allows access by multiple users simultaneously.

It is a still further object of the invention to provide a system for remotely accessing computer networks that is simple and economical to implement and maintain.

According to the objects of the invention, a system for remotely accessing computer networks is provided in which a central hub is connected to a computer network. The central hub may then be connected to a plurality of remote sites through an earth-orbiting satellite. Users at multiple remote sites may be connected to the central hub simultaneously through frequency management techniques.

BRIEF DESCRIPTION OF THE DRAWINGS

The above-identified and other objects and advantages of the present invention will become apparent to those skilled in the art upon reading the following detailed description of the preferred embodiments, in conjunction with a review of the appended drawings, in which:

FIG. 3 is a functional block diagram of a system according to the present invention.

DETAILED DESCRIPTION OF THE PREFERRED EMBODIMENTS

Figure 1:
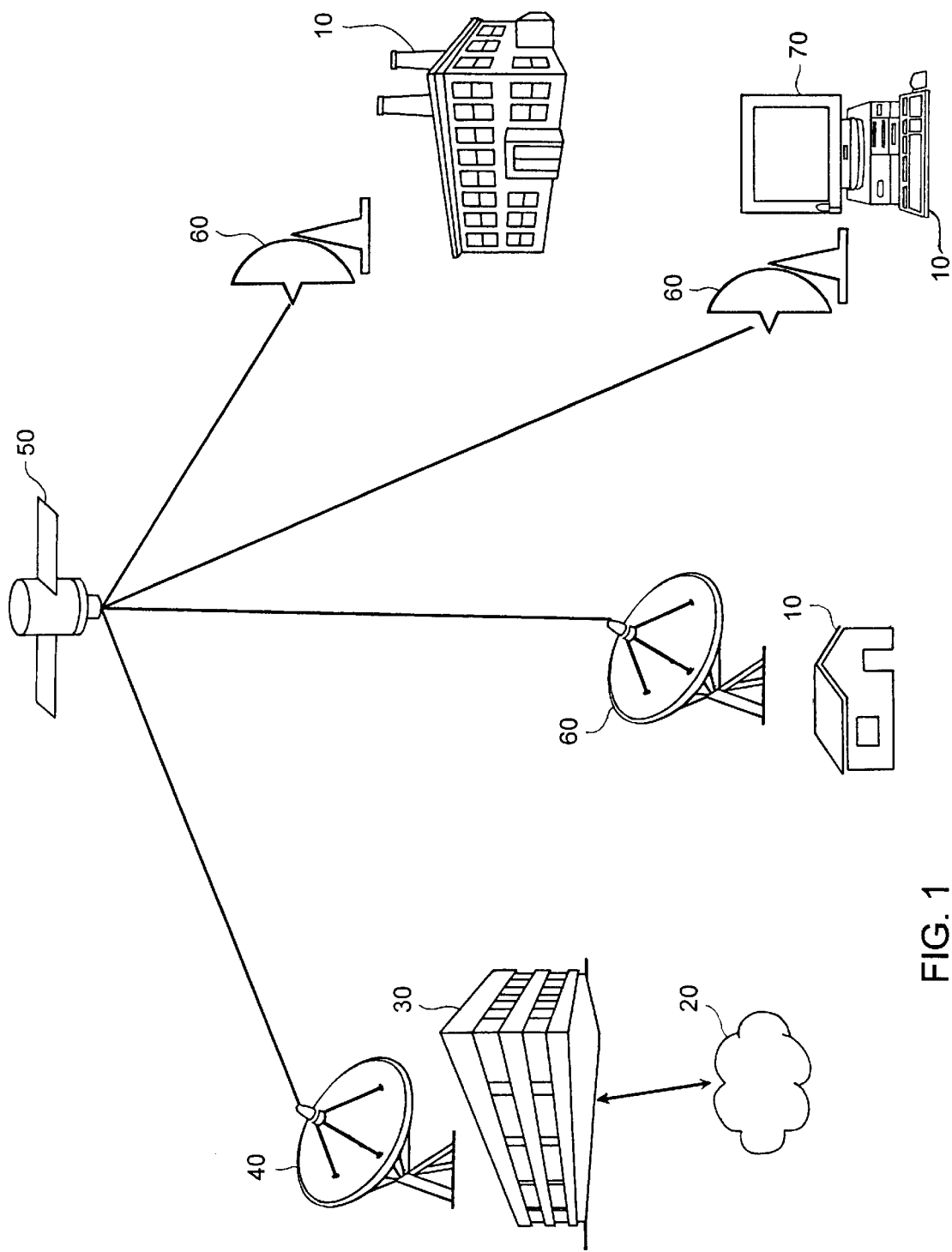
FIG. 1 is a schematic drawing of the overall system according to the present invention.

Referring now to FIG. 1, a schematic chart of an overall system according to a preferred embodiment of the present invention is shown. The system provides a digital data connection between various remote users 10 and a computer network (represented at 20). In the preferred embodiment, the computer network is preferably the Internet, including any protocols and standards such as the World Wide Web. It is to be understood that the computer network can be any network or computer gateway that provides access to other computers at other remote locations.

Preferably, the computer network is directly connected to a hub gateway station 30, which is part of the system of the present invention. By "directly connected," it is to be understood that the station 30 is connected to the computer network through any of various known means, such as a telephone, microwave or permanent hardwired connection. The hub gateway station provides hardware and software for processing multiple remote user connections simultaneously, as will be described more fully below.

Connected to the hub gateway station 30 is a satellite dish 40 capable of transmitting and receiving multi-frequency signals, as described more fully below. Preferably, the satellite dish is aimed at and in communication with a communications satellite 50 in earth orbit. Preferably, the satellite is stationed in a geosynchronous orbit providing direct line-of-sight communications with all of the intended remote users. It is contemplated that more than one satellite may be employed in the system of the present invention if some remote users are too remote to be contacted by a single satellite. In such case, either additional hub gateway stations could be set up for each additional satellite, which would in essence create an entirely separate system, or more than one satellite dish may be used with a single hub gateway station. It is also contemplated that less-expensive lower earth orbit satellites may be used with the present invention. These satellites are not geosynchronous and thus continually pass in and out of the range of the hub station and remote stations. In such a case, proper tracking software would be needed, including system components such as the automatic frequency control system, disclosed in co-pending U.S. patent application Ser. No. 08/650,616 to the present assignee. Any satellite communication frequency bands are contemplated, including, but not limited to, C-band, Ku-band, L-band, X-band, and Ka-band.

The remote users each have smaller satellite dishes 60, such as a 0.3-meter to 2.4 meter dish. The remote users 10 may preferably be any persons or organizations desiring to access the computer network 20. Due to the low level of capital available in many remote communities, it is likely that a central location or organization, such as a school, hospital or town meeting place would have the required remote user equipment of the present invention. The term "remote user" is intended to refer both to individuals who may be transferring information from/to the computer network, and organizations that might collectively own one set of the required hardware for the system.

Each remote user 10 will have a satellite dish 60 capable of transmitting/receiving data from the satellite 50. Each users' satellite dish 60 is connected to a workstation (see, e.g., 70). The exact configuration of each workstation 70 is unimportant, as long as the workstation is capable of communicating with the satellite 50 as discussed below. It is also preferred that the workstations, such as a personal computer, will contain the software necessary to interface ultimately with the computer network. For example, for accessing the World Wide Web, it is preferred that the workstation 70 would include a web "browser," which interprets data written in Hypertext Markup Language ("HTML"), Java, or other language used for documents on the Web.

Alternatively, each workstation 70 might include a standard communications software package for connecting with the hub gateway, while the hub gateway server would include any interface software, such as a web browser, for interpreting any documents retrieved from the Internet. Each workstation preferably includes a keyboard and a monitor for input/output to the remote user. The remote workstation 70 can also act as a server for a local area network (LAN) so that multiple users can take advantage of the satellite connectivity of the system.

As can be seen in FIG. 1, remote users 10 are connected to the computer network 20 by communicating with the satellite 50, which in turn communicates with the hub gateway station 30, which is in turn connected to the computer network 20. The details of how these communications are accomplished is described more fully below.

Frequency Selection and Allocation

Whenever a user at a remote system 10 desires to connect to the network 20, assuming now that the remote workstation 70 is properly loaded with the necessary software, the remote workstation will broadcast a request using its satellite antenna over a common signaling channel. After transmission through the satellite uplink, software within the hub station 30 will assign an available data channel and an available modem connected to the hub for the link to that particular remote workstation. The hub system will then broadcast the assigned channel code through the satellite to the remote workstation 70, causing the workstation to switch its transceiver to the appropriate channel.

In the preferred embodiment, a single transponder on the satellite would provide enough data capacity to accommodate 11,550 customers, as follows: Each transponder of the satellite has a total of 36 MHz of bandwidth. Leaving certain control signals aside (discussed below), approximately 33 MHz of usable bandwidth for data is available. Each user channel would be allocated 9.6 kbit duplex bandwidth, or 20,000 Hz, resulting in approximately 1650 simultaneous user channels. Of course, all customers will not be connected to the system all the time, so more than 1650 customers can be accommodated for use with a single satellite. Experience in customer usage rates has shown that approximately seven (7) customers can be adequately accommodated for each available data channel. Thus, multiplying the 1650 available data channels by seven customers for each channel equals the 11,550 customers per transponder. Of course multiple variations in the above calculations, such as the number of transponders, or the total bandwidth for each transponder or individual channel, may be made, ultimately affecting the number of customers that may be accommodated for a single transponder. More than one transponder may also be used to allow for more customers.

To allow for the possibility of more than one remote workstation requesting an available channel at a time, more than one signaling channel, preferably five, are reserved for communications from the remote workstation. Once requests are sent, however, the remote workstations will remain in a wait state for a response from the hub station, so only one channel is reserved for the responses, which are sent in sequence by the hub station.

Figure 2:
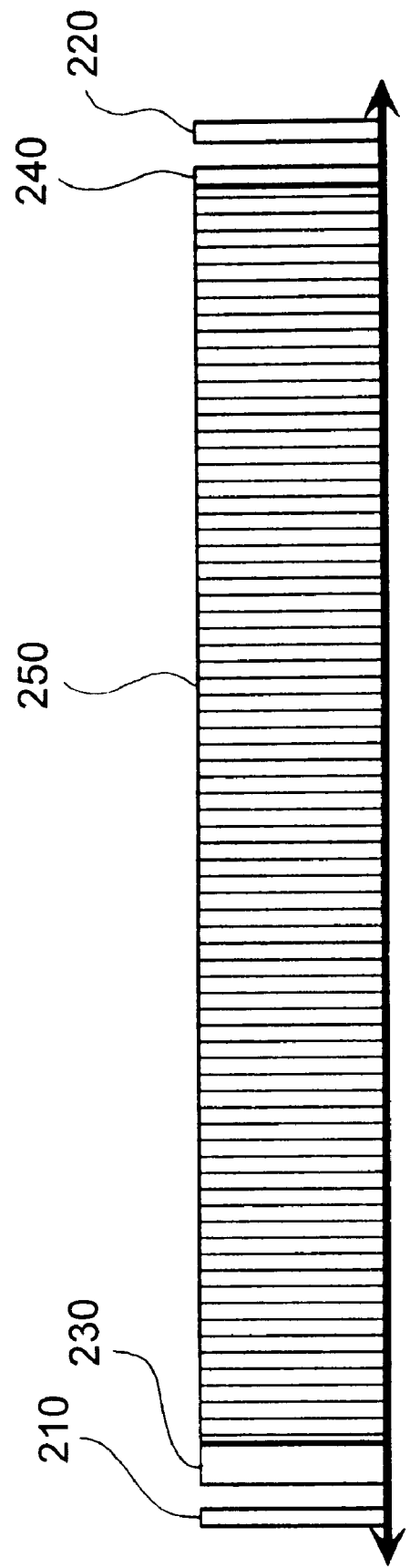
FIG. 2 is a graph representing a frequency spectrum as used by the system of the present invention.

The preferred frequency/channel allocation scheme is diagramed in FIG. 2, in which the frequency spectrum for a single transponder operating in the frequency range of 5925 MHz to 5965 MHz is shown. At the lowest frequency of this range, 2 MHZ (indicated at 210) is reserved as a guard band and is not used by the system. This guard band helps ensure that transmissions in the usable frequency will not interfere with or be interfered by other transponders in the adjacent frequency ranges. A similar guard band (at 220) is found at the highest frequency of the example range, between 5963 and 5965 MHz.

Signaling channels (at 230) are above the lower guard band. These are used by the remote systems for requesting data channels. Five duplex channels operating at 9.6 kilobits encompasses 100 KHz of the spectrum. Below the upper guard band is the single duplex channel (at 240) used by the hub system to transmit information to the remote sites with data channel assignments. This single duplex channel at 9.6 kilobits takes up 20 khz of the spectrum. In the majority middle section of the spectrum (at 250) are the 1650 duplex data channels, beginning at 5927.1 MHz and running up to 5960.1 MHz. Each duplex channel, at 9.6 kilobits, uses 20 KHz of the spectrum. Above that, the upper guard band is found. Other data transfer rates besides 9600 kilobits-per-second may be used as well with higher rates, more bandwidth is needed per channel. Thus, to maintain the number of user channels, the overall available transponder bandwidth would have to be increased. Alternatively, data compression or modulation may be used to achieve the same number of channels with the same transponder bandwidth.

By having a minimum of signaling channels from the remote workstation to the hub station, and only a single return channel from the hub station for data channel assignments, the maximum amount of bandwidth for a given transponder is left for data channels. Of course, the more data channels available for a given transponder, the greater is the number of subscribers that the system can effectively handle and the greater the revenues per transponder.

Referring now to FIG. 3, a functional block diagram of the system is shown. The hub station primarily consists of a server 300, which would be connected to the computer network through a more conventional connection 305, such as, but not limited to, ISDN lines, T1 lines or other telephone network connections. If necessary, multiple servers 300 and computer network connections 305 might be utilized. The specific hardware of the server is not critical.

A plurality N of modems 310 are connected to the server 300, each having a high enough throughput rate to sustain a data connection with one remote workstation. The modems 310 are preferably connected to the server through a multiplexer 315, capable of handling data to/from the full complement of modems simultaneously. The multiplexer 315 and the modems 310 are controlled by a network controller 320, which independently assigns a specific modem 310 to communicate with a specific remote workstation on request. Preferably, there is one single channel per carrier (SCPC) modem for each of the possible data channels, i.e., 1650 in the preferred embodiment, plus six for the control channels for a total of 1656. Each SCPC modem is set to a particular data channel. When needed, the network controller selects an open modem 310 and corresponding channel (see 250, FIG. 2) and assigns it to the remote terminal. Another modem configuration contemplated is multiple SCPC modems (one for each in-bound channel) and a smaller number of broad-band time division multiplex (TDM) modems for out-bound channels. Each TDM modem would then communicate with multiple remote workstations using packets addressed to each of the remote stations. TDM modems may also be used for in-bound channels.

The modems 310 are then connected into an RF terminal 330 which handles communications through the satellite dish to the orbiting satellite 50. Included in the RF terminal 330 is a mixer that receives data signals from the modems 310 and modulates the specific data channel selected for the modem 310 with those data signals. The data signals from all of the modems 310 are modulated, combined and transmitted to the satellite by a satellite dish antenna 340. Since the remote workstation has already received its data channel assignment, it will only be tuned to its data channel and will receive the data signals from its assigned modem 310.

In the other direction, data signals that are transmitted by the remote workstation 360 on its assigned data channel are received by the hub satellite dish 340 and RF terminal 330, which includes a frequency splitter and frequency converter so that only the data signals on the data channels will be passed through to the assigned modem 310. The data signals are then demodulated and sent through the multiplexer 315 to the server 300, which in turn passes the signals to the computer network.

At the remote station, the workstation 360 hardware is not critical, although it is preferred that it include at least a 486-type microprocessor. Besides any communications software, or network browser-type software, the workstation would only need to be loaded with the control software for its own modem and frequency converter. In the up-transmission portion of the communications hardware, the workstation is connected to a modulator/coder 370 that modulates the digital data signals from the workstation into RF signals. The RF signals are then converted preferably into the I-band by a converter 380. Use of the I-band is not critical and may be any frequency band used by the satellite. The I-band signals are then passed through an amplifier 390 and sent to the remote satellite dish 400 for transmission to the orbiting satellite 50.

In the down-transmission portion, the components are reversed. Data signals incoming on a satellite data channel are received by the antenna 400 and passed into an amplifier 410 and then into an I-band to RF converter 420. The resulting RF signals are then passed to the demodulator/decoder 430, which transmits the digital data signals to the workstation 360, completing the transmission.

Figure 4:
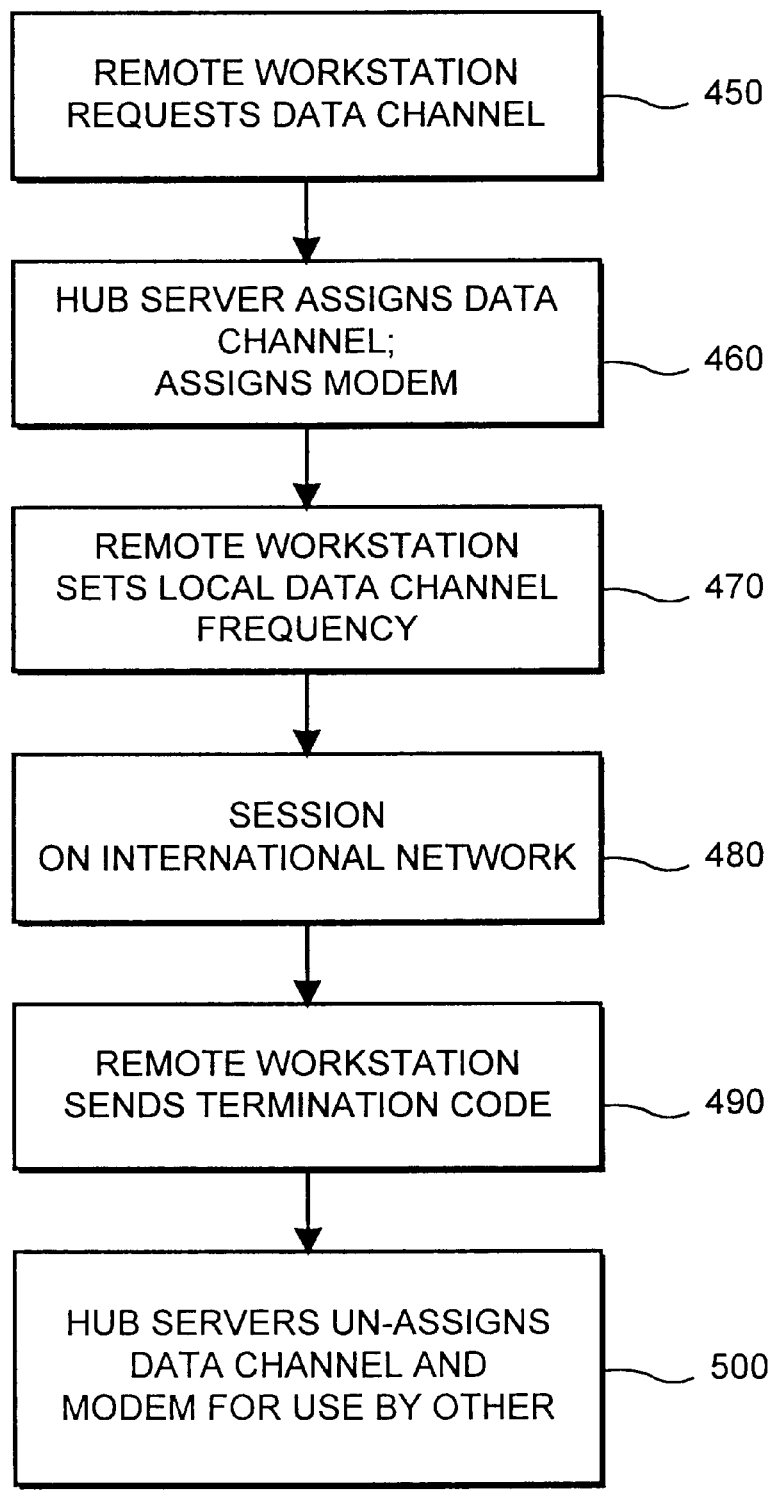
FIG. 4 is a logic schematic flowchart of the operation of a system according to the present invention.

Referring now to FIG. 4, a logic flowchart shows the functioning of the system. Initially, the workstation 360, based on a user's command, initiates a request for connection by transmitting a request signal over one of the five control channels discussed above (FIG. 4, at block 450). The workstation 360 selects one of the five control channels by monitoring the channels and choosing one that is not in use at that time. The request signal would also include identifying information about the remote workstation, for use by the hub server in verifying the subscriber status of the remote user, or for billing purposes, if necessary. The hub server 300 receives the request signal, and selects one of the free data channels. The server then causes the network controller 320 to assign one of the modems 310 to that data channel and transmits an identifier for that data channel back to the remote workstation (at block 460) on the single return control channel (240, FIG. 2). The workstation 360 then causes its modulator/demodulator/converter hardware to be set to the selected data channel as well (at block 470). With the modem at the hub site and the remote communications hardware both tuned to the same data channel, bi-directional data transfer may commence, making a transparent connection between the user and the computer network (at block 480). Upon terminating the session, the remote workstation 360 transmits a termination signal (at block 490), which is received by the server 300, which causes the network controller 320 to unassign the particular modem on that data channel, ultimately ending communication through the satellite link (at block 500).

Of course, it is to be understood that the particular frequency bands, data rates, and channel characteristics disclosed are preferred, but not the only operative embodiments. Other selections may be made and would be similarly operative in the present invention.

While the embodiments shown and described are fully capable of achieving the objects and advantages of the present invention, it is to be understood that the embodiments are shown and described for the purpose of illustration only and not for the purpose of limitation, the invention being limited only by the claims, which follow.

What is claimed is:

1. A communication system for transferring data between a remote workstation and a computer network through an earth-orbiting satellite including a transponder operating in a frequency spectrum including a plurality of data channels, said communication system comprising:

a central hub gateway server directly connected to a computer network, said central hub gateway server including a plurality of modems, each of said modems being respectively assigned to a particular one of said data channels, a first satellite transceiver connected to said modems, said first transceiver comprising a satellite antenna and a means for modulating the frequencies of data signals from said modems to a satellite frequency band;

a remote workstation; and a second satellite transceiver connected to said remote workstation, said second transceiver comprising a satellite antenna and a frequency modulating means;

said first and second transceivers both transferring data to and from said satellite such that data is transferred between said computer network and said remote workstation.

2. The system as in claim 1, wherein said modems are single channel per carrier (SCPC) modems.

3. The system as in claim 1, wherein said modems are comprised of a first number of SCPC modems for receiving data from said satellite and a second number, less than the first number, of broad-band time division multiplex (TDM) modems for transmitting data to said satellite, each TDM modem transmitting data to multiple remote workstations through said satellite using addressed data packets.

4. The system as in claim 2, wherein said modems operate in a frequency division multiple access scheme.

5. The system as in claim 4, wherein said frequency spectrum of the transponder is further divided into a plurality of control channels.

6. The system as in claim 5, wherein there are five control channels contiguous with 1650 data channels, each of said channels having a bandwidth of 20 kHz.

7. The system as in claim 6, wherein said control and data channels are bounded by guard bands.

8. The system as in claim 7, wherein said transceivers operate in one of the C-band, Ku-band, L-band, X-band and Ka-band.

9. A communication system for transferring data between a remote terminal having a satellite transceiver and a computer network through an earth-orbiting satellite, said system comprising:

a central hub gateway server directly connected to a computer network, said central hub gateway server including a plurality of modems, each of said modems being assigned to receive and transmit signals in a specified data channel;

a first satellite transceiver connected to said modems, said first transceiver comprising a satellite antenna and a means for modulating the data signals from said modems to a satellite frequency band;

said first transceiver transferring data between said computer network and said remote workstation.

10. The system as in claim 9, wherein said modems are single channel per carrier (SCPC) modems.

11. The system as in claim 9, wherein said modems are comprised of a first number of SCPC modems for receiving data from said satellite and a second number, less than the first number, of broad-band time division multiplex (TDM) modems for transmitting data to said satellite, each TDM modem transmitting data to multiple remote workstations through said satellite using addressed data packets.

12. The system as in claim 10, wherein said modems operate in a frequency division multiple access scheme.

13. The system as in claim 12, wherein said transceivers communicate with a transponder of said satellite operating in a particular frequency spectrum, said frequency spectrum being divided into a plurality of control channels and a plurality of data channels.

14. The system as in claim 13, wherein there are about five control channels contiguous with about 1650 data channels, each of said channels having a bandwidth of about 20 kHz.

* * * * *